Patented Feb. 20, 1951

2,542,039

UNITED STATES PATENT OFFICE 2,542,039

PROCESS FOR THE DISPOSAL OF EXCREMENTS BY DESTRUCTIVE RETORT DISTILLATION

August G. Liebmann, Washington, D. C., assignor of one-half to Harry A. Blessing, Washington, D. C.

No Drawing. Application July 18, 1949, Serial No. 105,457

3 Claims. (Cl. 110—11)

The present invention relates to the process of disposal of the derivatives of excrements.

Reference is had to my co-pending application Serial No. 578,856, filed Feb. 20, 1945, said application having matured into Patent No. 2,477,632, dated August 2, 1949, for the excrement incinerator.

In the aforementioned patent, the function of the retort and the receptacle render the process herein described as expeditious, efficient, economical and sanitary. The present process contemplates the use of said apparatus.

In the present process the salts derived from the fecal matter and mineral composition of the receptacle, provide with heat application, all that is necessary to obtain the desired results, without adding any salts or acids from exterior sources to accelerate the process of ignition, combustion, evaporation, distillation and sublimation.

In the present process, a sublimation of sal-ammoniac is derived from the dung, in the preliminary or evaporation stage of heat. This ammonium chloride $NH_4Cl$ or sal-ammoniac, which is a sooty fibrous precipitate, collects upon the inner upper walls of the central chamber of the retort when interlocked with the receptacle.

In the dry-distillation or secondary stage, the sal ammoniac above noted with that of the urine precipitate, combines with the calcium carbonate substance, forming the receptacle, which forms carbonate of ammonia, a salt far more volatile than either of those originally present, thus the derivative ammonium carbonate rapidly escapes in vapor.

Bearing in mind the daily organic fecal matter per capita is from 43 oz. or at most 2¾ lbs., the chemical contents per pound being, viz.:

| | |
|---|---|
| Ammonia free | .0110 |
| Chlorine | .0352 |
| Ammonia albuminoid | .0031 |
| Nitrogen, total | .0213 |

Daily bacteria per lb. per capita, 300 billions.

In the volatilization of the ammonium carbonate, as noted, there is a precipitate replacement of chloride of calcium in the receptacle, for the reason that the decomposition is effected by the volatility of the ammonium carbonate.

Furthermore among the several carbonates of ammonia, urine is one that is derived by natural fermentation when the compound becomes a few hours old.

All of the ammonical salts are volatilized by high temperature, and yield the ammonical odor which is neutralized by the exhaustion into atmosphere through live flame, of the retort.

The precipitate replacement of chloride of lime, calcium chloride, serves as an absorbent and disinfectant and deodorant of noxious odors in the provision of the apparatus for the function of the within named process.

The heats are below red heat, or 509° F. except a slightly higher range momentarily to diffuse any phosphorous and sulphur compounds.

Within the porous receptacle of the retort the carbon, nitrate and nitride compounds are absorbed when not volatilized.

Cupellation is a process in metallurgy, related to this dry way of obtaining reaction of salts; cupellation is founded upon the circumstances that a given element when exposed in a state of fusion to the action of the air, neither gives off perceptible vapor, nor is sensibly oxidized, particularly when a more oxidizable element than itself is at the same time present.

In order then to expel the ammonium compounds (hydrogen-nitrogen) it is only necessary to expose them on some proper absorbent material as that of the minerals utilized in the receptacles, at, and to, such temperature as may in connection with the precipitates of the retort expel the undesirable salts and retain the desirable as noted.

The fatty acids, bacteria, pathogenic or otherwise, are destroyed in the ignition and incineration. The treatment of excreta should be immediate as it soon begins to putresce and becomes a filthy problem.

A modified form of this process, admits the heating of a calcium chloride, with sulphate of ammonia, thus expelling ammonium chloride and obtaining sulphate of lime (gypsum) as residue in the receptacle.

Fecal matter contains elements of combustion and by the aid of heat, these elements are decomposed.

(1) By the temperature by which decomposition is effected.

(2) By the degree of chemical affinity which exists among the various elements.

(3) By the relative degree of volatility.

In these components, the elements such as oxygen and hydrogen are immediately expelled, carbon tends to unite to some extent with other elements forming new compounds such as olefiant gas which serves to elevate the temperature; thus the greater the proportion of the hydrogen, and the less the quantity of oxygen, the more numerous are the combinations of carbon thus produced; but insufficient to combine with the whole of the carbon present, a portion invariably remains in the receptacle for absorption by cupellation, as described.

To summarize, the process consists in initially placing excrement in the receptacle and closing the retort on the receptacle and applying heat to both elements.

The repeated operation causes sal-ammoniac to be deposited over the inner surface of the retort. After the deposit is sufficient the process is then ready to be carried on continuously or intermittently.

The excrements are subjected to heat to cause the vaporization stage and further depositing of sal-ammoniac on the inner surface of the inverted bowl-like chamber of the retort.

Further heat is applied to the elements whereby a dry distillation is obtained resulting in precipitations in said receptacle of calcium chloride and absorption of the carbon derivatives in the bowl of the receptacle.

Thus by a two stage application of heat, in the first vaporization of liquid, and in the second dry distillation of the salts for the uses and purposes of disposal of excrement and utilizing the chemical contents thereof to facilitate the functional operation as well as disinfecting the means by which the same is accomplished.

What I claim as new:

1. The process of disposal of excrements by heat and reaction of the derivative components thereof when combined with the components of the apparatus comprising; providing a receptacle of calcium carbonate; providing a covering retort having a precipitate of sal-ammoniac thereon above said receptacle, and adapted to be placed in sealing relation to said receptacle, placing said excrements in said receptacle and closing said retort on said receptacle, applying heat to said receptacle and retort and thereby forming a vaporization stage and depositing sal-ammoniac on the inner surface of the retort, applying further heat to said receptacle and retort whereby calcium chloride is precipitated in said receptacle, the carbon derivatives being absorbed in the receptacle by the resulting distillation process.

2. The process of disposing of excrements by heat comprising; providing a receptacle of calcium carbonate, providing a covering retort having a precipitate of sal ammoniac above said receptacle and adapted to be placed in sealing relation to said receptacle, placing said excrements in said receptacle and closing said retort on said receptacle, applying heat to said receptacle and retort and thereby forming a vaporization stage and depositing sal-ammoniac on the inner surface of the retort, applying further heat to said receptacle and retort whereby the residue therein is subjected to dry distillation, and the volatile products of such dry distillation being deodorized by contact with the precipitate of sal-ammoniac upon the retort, and the carbon derivatives, nitrates and nitrides produced by such dry distillation being absorbed in the calcium carbonate substance of the receptacle.

3. The process of disposal of excrements by heat comprising; providing a receptacle of calcium carbonate, providing a covering retort having a precipitate of sal-ammoniac above said receptacle and adapted to be placed in sealing relation to said receptacle, placing said excrements in said receptacle and closing said retort on said receptacle, applying heat to said receptacle and retort and thereby partially vaporizing the ammonium compounds as additional sal-ammoniac and depositing the same upon the inner surface of the retort, applying further heat to said receptacle, whereby more of the volatile compounds are driven off from the residue, the said volatile compounds being deodorized by contact with the precipitate of sal-ammoniac upon the retort and whereby the chloride compounds from the elements react chemically with the calcium carbonate of the receptacle to form a precipitate of calcium chloride therein, the calcium chloride thus formed serving as a disinfectant for the residues within the receptacle.

AUGUST G. LIEBMANN.

REFERENCES CITED

The following references are of record in the file of this patent:

UNITED STATES PATENTS

| Number | Name | Date |
| --- | --- | --- |
| 315,397 | Engle | Apr. 7, 1885 |
| 329,302 | Engle | Oct. 27, 1885 |
| 370,223 | Vincent | Sept. 20, 1887 |
| 379,189 | Vladyka | Mar. 6, 1888 |
| 2,477,632 | Liebmann | Aug. 2, 1949 |